United States Patent [19]
Spielberg et al.

[11] 3,844,830
[45] Oct. 29, 1974

[54] SINTERING PROCESS FOR METALLIZING NON-METAL SUBSTRATES

[75] Inventors: David H. Spielberg, Schaumburg; Kenneth R. Janowski, Wheaton; Charles J. Levesque, Hoffman Estates, all of Ill.

[73] Assignee: Universal Oil Products Company, Des Plaines, Ill.

[22] Filed: Dec. 27, 1972

[21] Appl. No.: 319,095

[52] U.S. Cl............................. 117/160 R, 117/22
[51] Int. Cl.............................................. C03c 17/06
[58] Field of Search........................... 117/160 R, 22

[56] References Cited
UNITED STATES PATENTS

| | | | |
|---|---|---|---|
| 3,189,476 | 6/1965 | Cowan | 117/160 R |
| 3,215,555 | 11/1965 | Krey | 117/160 R |
| 3,637,435 | 1/1972 | Schwyn et al. | 117/160 R |

Primary Examiner—Leon D. Rosdol
Assistant Examiner—Edith L. Rollins
Attorney, Agent, or Firm—James R. Hoatson, Jr.; Clark, Barry L.; William H. Page

[57] ABSTRACT

Improved method of metallizing the surface of a ceramic or other non-metallic body achieves a firmly adherent, wettable metallized coating at temperatures substantially lower than the normal sintering temperature of the metal oxide source of the metal coating. A composite, comprising a ceramic body having a slurry coating of a metal or thermally decomposable compound thereof applied to its surface is redox cycled by being repeatedly and alternately subjected to an oxidizing atmosphere and a reducing atmosphere. The number of redox cycles required to achieve an adherent coating is inversely proportional to the temperature. The metal must be one which will undergo surface oxidation and reduction in the atmospheres and at the temperature used while the non-metal substrate must not undergo surface oxidation and reduction.

11 Claims, 2 Drawing Figures

SINTERING PROCESS FOR METALLIZING NON-METAL SUBSTRATES

BACKGROUND OF THE INVENTION

This invention relates to methods of metallizing the surfaces of ceramic or other non-metal bodies and particularly to an improved method of metallizing by sintering. There are many instances where it is desirable to form a ceramic-to-metal seal. Such sealing is normally performed by soldering. However, since ceramics are normally not wetted by soldering alloys, ceramic materials have to be metallized prior to soldering. Metallizing of the surface of ceramic materials can proceed in many ways. A large number of technically different methods have been proposed and used during the last 30 years, but only a few are still extensively used. The various methods can be classified in one of the seven following categories: (1) heavy metals, (2) $MoO_3$, (3) glasses, (4) noble metals, (5) active metals, (6) molybdenum-manganese, and (7) sintered oxides.

The heavy metal method involves the use of a finely ground suspension of a heavy metal, i.e., tungsten, molybdenum, etc., which is painted onto the ceramic, allowed to dry and sintered onto the surface. The sintering proceeds normally in vacuum or in an inert atmosphere. However, in order to get better adherence, a small amount of oxygen in the atmosphere has been found to be necessary. A thoroughly controlled atmosphere is very important for this method and a high sintering temperature is required.

The $MoO_3$ method is a variation of the heavy-metals method in which $MoO_3$ is sintered onto the ceramic at high temperatures in a hydrogen atmosphere. The $MoO_3$ volatilizes and is reduced, leaving behind a very finely powdered molybdenum metal with a large surface area and good adherence to the ceramic.

Sealing with the aid of glass is done by filling the empty space between the metal and ceramic with fused glass which solidifies upon cooling. The bond is very stiff and even a slight difference in expansion between the metal and the ceramic can destroy the adherence.

Coatings of noble metals on ceramic materials have been used for joining for several hundred years. This technique has the advantage that the sintering can be performed in air, but the adherence is not sufficient to achieve high strength bonds.

The active metal method relies on the ceramic wetting properties of titanium and/or zirconium to provide a base for soldering. Hydrides of titanium and zirconium are used now for improved sintering instead of the pure metals, but even these are very sensitive to impurity contamination during the sintering due to their high affinity for oxygen, nitrogen, etc., and even trace amounts of these impurities can severely reduce the bonding ability. Unless an alloy is used, the sintering temperature will also be quite high.

The molybdenum-manganese method is a modification of the heavy-metals method of metallizing. The ceramic surface is usually fluxed first and then the molybdenum-manganese mixture is sintered to the clean surface. Normal soldering materials do not adhere very well to molybdenum-manganese layers. Consequently, it is necessary to apply a coating of nickel or copper prior to soldering. This makes the process complicated as three heat-treatments at different temperatures and in different atmospheres are necessary to accomplish a ceramic-to-metal seal. Furthermore, the method is very sensitive to small variations in the furnace atmosphere and temperature. It is, however, the most commonly used method today for metallizing oxide ceramics.

Metallizing by sintering an oxide layer on the ceramic surface with a subsequent reduction of the surface layer to metal can mainly be used with the oxides of the following metals and alloys thereof: copper; cobalt; molybdenum; manganese; silver; nickel; or iron. This method also involves high sintering temperatures, or long treatment times, and is limited to oxides which at reduction undergo only negligible volume changes.

An example of a prior art sintered oxide method of metallizing the surface of a ceramic body is set forth in U.S. Pat. No. 2,706,682 wherein copper oxide is compressed against the surface of a ceramic body, sintered in air, and then reduced in hydrogen at a temperature less than the sintering temperature. Another example in the aforementioned patent notes that thin copper foil can be applied to the ceramic, heated slowed in air to 1,100°C (above the melting point of copper and copper oxide) and maintained for 40 to 60 minutes to cause the copper to be oxidized and the oxide to melt. The oxidized body is then cooled in air and reheated in a hydrogen atmosphere at a temperature of at least 450°C to reduce the cupric oxide to metallic copper.

The standard temperature for conventional metallizing sintering operations can be defined as that temperature at which a metal or metal oxide will sinter in 1 hour. In the case of CoO for example, the standard sintering temperature in air is about 1,700°C as compared to the CoO melting point of about 1,800°C. Although sintering can be accomplished at somewhat lower temperatures by heating the material for longer periods, we found in one experiment that sintering CoO for 16 hours at 1,500°C did not produce an adherent coating.

There are many reasons why it would be desirable to be able to metallize at a lower temperature. One being where the choice of materials to be metallized, or the substrates which can be used, is limited by the fact that a desired substrate has a lower melting or softening point than the standard sintering temperature of a desired metallizing material. For example, CoO, which is normally sintered at 1,700°C, cannot be sintered to Pyrex glass which softens at about 600°C. Expense is also a very important factor. Ordinary laboratory furnaces incorporating nichrome heating elements are only capable of producing temperatures up to about 1,200°C. Furnaces heated by silicon carbide elements can heat to about 1,500°C but generally cost two or three times as much as the nichrome heated furances. Refractory metal resistance furnaces can heat to temperatures above 2,500°C but generally cost at least ten times as much as nichrome heated furnaces. A similar situation prevails with thermo-couples, with the chromel-alumel type being relatively inexpensive but satisfactory only to about 1,200°C. Platinum types are more expensive but are only good for temperatures up to about 1,400°C. For higher temperatures, very sophisticated, expensive, and difficult to obtain devices are used. Energy costs also increase at an increasingly faster rate as temperature requirements rise. Furthermore, high temperature sintering requires long warm up and cool down periods for heating and cooling the materials without subjecting them to thermal shock.

SUMMARY OF THE INVENTION

As discussed above, existing commercially accepted methods of metallizing by sintering have required the use of a closely controlled atmosphere and/or a high sintering temperature. Our improved process for metallizing, which we define as a redox metallizing process, overcomes the requirement for the closely controlled atmosphere and high temperatures of the prior art. Our process permits a firm bond to be achieved between certain metals and ceramics or other non-metals such as glass at temperatures well below conventional sintering temperatures. The preferred metallizing materials used for our process should be those used for the prior art sintered-metal oxide method; that is, oxides which at reduction only sustain negligible volumetric changes. For metallizing, the selection would normally not include the more noble metals which do not form stable oxides and the more active metals, i.e., titanium, aluminum, etc., which have such high free energies of oxidation that they are difficult to reduce from the oxide state. Even these metals can be used for redox metallizing but there would be no advantage to redox metallizing compared to other metallizing techniques. The most successful metal selections include copper, cobalt, nickel and iron and/or alloys thereof. The redox metallizing temperature, the number of redox cycles and the length of time for each cycle is determined by the metal oxide being used and how readily the metal will oxidize and reduce throughout the entire layer while on the ceramic surface.

Our process requires starting with the application of a layer of a metal or metal compound, preferably a metal oxide, to the surface of the ceramic, heating it in a furnace to a temperature at which the metal oxide can be readily reduced to its metallic state, without oxidizing or reducing the ceramic substrate, and cycling the atmosphere from oxidizing to reducing (hereinafter termed redox cycling). We have found that our metallizing process using redox cycling can be carried out more rapidly and at a lower temperature than if bonding were to occur strictly by thermally activated diffusion in an unchanging atmosphere as in a conventional sintering operation. Also, the quality of the atmospheres used need be only sufficient to supply a means of reducing and oxidizing the surface of the metallizing component. The redox metallizing process can end on a reducing stage leaving the metallized layer ready for soldering.

Our redox metallizing process permits metallizing to be accomplished at much lower temperatures than are possible with conventional sintering processes. It thus overcomes the problems described hereinabove such as high furnace, thermocouple and energy costs and permits metallic coatings to be applied to substrates which could not previously be used. For example, we have noted that the standard sintering temperature in air for CoO is 1,700°C. Using conventional sintering techniques, we have found that this temperature produced an adherent metallized surface on a ceramic plate in one hour while a temperature of 1,500°C for 16 hours was found to be insufficient to produce an adherent coating. With our redox metallizing process, we have found that it is possible to obtain equally good adherence of CoO to a ceramic plate at a temperature of only 1,100°C, using six redox cycles over a period of one hour. By cycling at a faster rate and/or for a longer time, an equally adherent coating can be achieved at lower temperatures. For example, redox cycling at the same 10 minute cycle length for two hours rather than one should permit the temperature to be reduced from 1,100°C to 1,000°C. Although the above noted examples utilized a 10 minute cycle, the cycle time is almost completely dependent on the time it takes to change the atmosphere. Where air and hydrogen are used as the atmospheres for oxidizing and reducing, safety precautions dictate that the gases be changed slowly to avoid any danger of an explosion. Also, the volume of the furnace and piping introduces a delay in the ability to switch atmospheres. The change can be made much faster if one gas is evacuated before the other enters the furnace.

Interestingly, our process does not require that different gases be used. The gas need only have sufficient chemical activity to both oxidize and reduce the metal of interest. Thus, a gas such as hydrogen, can be used to both oxide and reduce, depending on its dew point at the sintering temperature. When the hydrogen is relatively dry it will reduce the metal oxide coating, and when it is made moist, such as by passing it through a bubbler, it will oxidize the metal coating. Obviously, the time required to cycle between wet hydrogen and dry hydrogen can be very short as compared to the time required to switch between two gases which react in an explosive manner. Fast cycling can also be obtained by using bottled argon rather than air as a source of oxygen since bottled argon normally includes about 0.1 percent oxygen and will not react explosively with hydrogen.

We have found that the penetration or adherence of the metal coating to the ceramic substrate increases with the number of redox cycles, with the rate of penetration being quite rapid at first and gradually tapering off. Since the number of redox cycles required to achieve an adherent coating is inversely proportional to the temperature, it is possible to utilize various combinations of redox cycles and temperatures, depending upon equipment availability and economic considerations. The time length of the redox cycle is dictated almost entirely by the time period which is required to switch from one atmosphere to the other since the surface particles in the coating react very quickly to the oxidizing or reducing gases.

The exact nature of what action takes place during our redox metallizing process is not known, but considering known mechanisms associated with sintering and activated sintering, it is quite possible that one or more of six things could contribute to the activated sintering that takes place. These include:

a. Vacancy Generation Aiding Surface Diffusion

As the particulate surface is transformed back and forth from the oxide and the metal, the cyclic transformation is quite likely to produce a large number of vacant lattice sites in both the oxide and metal surface layer. This could drastically increase the rate of diffusion on the surface. Such a phenomenon would lead to rapid neck growth between particles and spheroidization of pores but no density increase.

b. Finer Grain Size

Since the furnace temperature is generally several hundred degrees lower than that normally used for sintering, grain growth rates should be markedly lowered in redox sintering. This could have several beneficial effects. Since grain boundaries have been shown to be vacancy sinks, pore shrinkage will be more rapid in a finer grained material. Finally, the finer the grain size of the final pore-free product, the higher will be the strength of the sintered body.

c. Transformation Stresses

Due to the volume difference between the metal powder and its oxide, transformation stresses will be produced in both the surface and interior of the particles after redox cycling. These residual stresses could possibly provide some of the driving force necessary to cause sintering at lower temperatures.

d. Localized Pressure Effects Due To Volume Changes

As the volume change occurs during redox cycling, there will probably be a local re-ordering of particles to accommodate the expansion or contraction. This can produce localized stresses at the contact points between particles. It is possible that these stresses may be great enough to cause a pressure-type sintering mechanism to occur on a localized scale.

e. Clean Surface Welding

The phenomenon of sintering by the welding of atomically clean surfaces has been observed in metal powders as well as with larger metal objects. The removal of surface layers allows direct atomic bonding across the interface. It is conceivable that during redox cycling, the metal powder surfaces are cleaned of any barrier films which would otherwise inhibit the atomic bonding at particle contact points.

f. Exothermic Reaction

As the particle surface layer is oxidized and reduced, it is possible that the heat of reaction will be sufficient to cause localized bonding. This might, of course, change the rate of grain growth as well, thereby resulting in grain coarsening.

BRIEF DESCRIPTION OF THE DRAWINGS

In FIG. 1, a ceramic disc 10 is shown with an annular metallized coating 12 applied to its upper surface in accordance with the method of the present invention. A lead wire 16 is connected to the coating 12 by solder 18.

In FIG. 2, the disc 10 is shown in cross-section with the thickness of the upper metallic coatings 12, and the lower metallic coating 20 greatly exaggerated for clarity.

Figure 1:
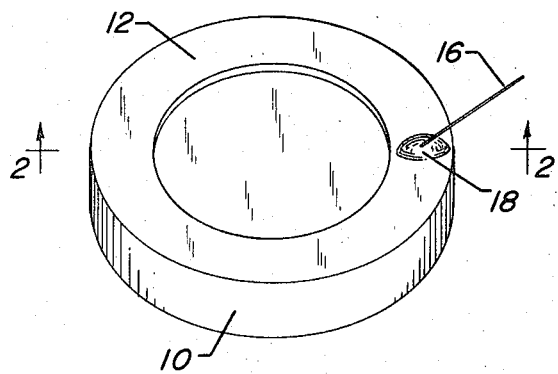
FIG. 1 is a perspective view of a ceramic disc which has been metallized on a portion of its surface.
Figure 2:
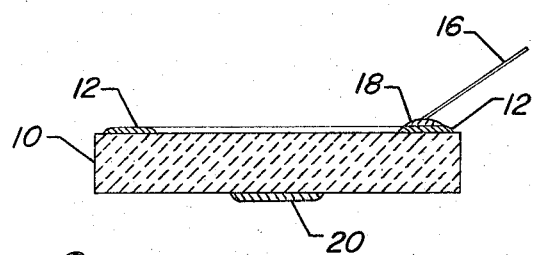
FIG. 2 is a side sectional view of the metallized disc taken on line 2—2 of FIG. 1.

Several examples which illustrate our improved reduced temperature redox metallizing process are as follows:

EXAMPLE 1

The materials selected for this example were zirconia stabilized with 10 percent $Y_2O_3$ for the ceramic and cobalt monoxide CoO for the metallizing component. No ceramic surface preparation was done. The fine CoO powder was suspended in a water slurry, painted onto the ceramic surface, and air dried. The ceramic was then placed in a controlled atmosphere furnace and heated to 1,050°C in air. Commercial cylinder hydrogen and compressed air were used for the respective reducing and oxidizing atmospheres. The pressures and flow rates used were sufficiently low to eliminate the chance of explosion when changing from one gas to the other. A half cycle time of five minutes per gas was used. Five redox cycles were sufficient to produce a firmly adherent, metallized layer on the ceramic. After cooling the metallized ceramic in hydrogen, eutectic silver solder was placed on it and reheated to 800°C in hydrogen. The solder wetted well and firmly adhered to the metallized ceramic.

EXAMPLE 2

For this example, the conditions for example 1 were repeated except that the furnace temperature was reduced to 875°C and the number of redox cycles was increased to 20. A firmlyl adherent, metallized layer of cobalt on the ceramic was achieved.

EXAMPLE 3

Pyrex glass cannot be metallized by conventional methods because of the high temperatures normally involved. Using CuO for the metallizing material on a Pyrex plate, the redox cycling was done at 600°C. Five cycles of 5 minutes per half cycle were sufficient to produce an adherent solderable layer.

EXAMPLE 4

For this example, the conditions and results of example 1 were repeated except that an oxide of the alloy of 70 w/o Co and 30 w/o Fe was used instead of CoO for the metallizing component, the furnace temperature was 980°C and nine redox cycles were used.

EXAMPLE 5

For this example, the conditions and results of example 4 were repeated except 30 w/o Ni was alloyed with 70 w/o Co.

By examining photomicrographs taken of test specimens following varying numbers of redox cycles at different temperatures, we have concluded that good wetting of the ceramic surface by the metal and a firmly adherent bond can be achieved in either a small or a large number of redox cycles, depending, respectively, on whether the temperature is close to, or considerably less than the standard sintering temperature for the metal oxide. As explained hereinabove, the length of redox cycle time the specimen is held in either an oxidizing or reducing atmosphere is not particularly critical as long as surface oxidation and reduction of the metallizing component occurs.

We claim as our invention:

1. Method of metallizing at least a portion of the surface of a non-metallic substrate with a firmly adherent coating of a metallizing material selected from the group consisting of a metal, metal alloy or metal oxide thereof, comprising the steps of:

applying a coating of the metallizing material to the surface of the non-metallic substrate;

heating the composite so formed in a furnace at a temperature less than the standard sintering temperature of said coating and less than 1,100°C;

repeatedly changing the atmosphere in said furnace from an oxidizing nature to a reducing nature while maintaining said temperature so as to alternately oxidize and reduce the surface of said coating, said metallizing material and said non-metallic substrate being selected such that said metallizing material is one which will undergo surface oxidation and reduction at said temperature in said furnace while said non-metallic substrate will not.

2. The method of metallizing set forth in claim 1 wherein said temperature is the lowest temperature at which said coating will oxidize and reduce.

3. The method of metallizing set forth in claim 1 wherein said coating is at least 50 w/o cobalt.

4. The method of metallizing set forth in claim 3 wherein said non-metallic substrate is stabilized zirconia.

5. The method of metallizing set forth in claim 1 wherein the atmosphere in said furnace is cycled from an oxidizing to a reducing nature at least five times.

6. The method of metallizing set forth in claim 1 wherein hydrogen is used to provide both an oxidizing and reducing atmosphere by varying its moisture content.

7. The method of metallizing set forth in claim 1 wherein air is the source of the oxidizing atmosphere in said furnace.

8. The method of metallizing set forth in claim 1 wherein argon containing about 0.1 percent oxygen is the source of the oxidizing atmosphere in said furnace.

9. The method of metallizing set forth in claim 4 wherein said temperature is less than 1,100°C.

10. The method of metallizing set forth in claim 5 wherein the time for each oxidation and reduction cycle is about ten minutes or less.

11. Method of metallizing at least a portion of the surface of a ceramic substrate with a firmly adherent coating of metal chosen from the class consisting of copper, cobalt, iron, nickel and alloys thereof comprising the steps of:

applying an oxide coating to the substrate, said oxide coating being an oxide of a metal which undergoes surface oxidation and reduction at temperatures lower than that of the substrate;

heating the composite so formed in a furnace in an oxidizing atmosphere to a temperature less than its standard sintering temperature;

changing the atmosphere in said furnace from an oxidizing characteristic to a reducing characteristic while maintaining said temperature;

redox cycling the atmosphere in said furnace from an oxidizing to a reducing characteristic to alternately oxide and reduce said metal coating;

and cooling said composite in a reducing atmosphere.

* * * * *